United States Patent
Kuribayashi et al.

(10) Patent No.: US 7,489,460 B2
(45) Date of Patent: Feb. 10, 2009

(54) MAGNETIC DATA READ CIRCUIT AND CARD PROCESSING UNIT

(75) Inventors: Ikuro Kuribayashi, Nagano (JP); Katsuhisa Higashi, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 163 days.

(21) Appl. No.: 11/535,816

(22) Filed: Sep. 27, 2006

(65) Prior Publication Data

US 2007/0139802 A1    Jun. 21, 2007

(30) Foreign Application Priority Data

Sep. 27, 2005    (JP) .............. 2005-279496

(51) Int. Cl.
G11B 25/04    (2006.01)
(52) U.S. Cl. .............. 360/2; 360/29; 360/39; 360/53
(58) Field of Classification Search .............. 360/2, 360/29, 31, 48, 39, 53
See application file for complete search history.

(56) References Cited

U.S. PATENT DOCUMENTS

| | | | | |
|---|---|---|---|---|
| 4,914,528 A | * | 4/1990 | Aoki et al. | 360/46 |
| 5,204,513 A | * | 4/1993 | Steele | 235/449 |
| 5,396,370 A | * | 3/1995 | Behr et al. | 360/2 |
| 5,532,885 A | * | 7/1996 | Okamura | 360/46 |
| 6,125,154 A | * | 9/2000 | Sutardja | 375/345 |
| 6,400,517 B1 | * | 6/2002 | Murao | 360/2 |
| 6,570,722 B2 | * | 5/2003 | Yokozawa et al. | 360/2 |
| 6,600,613 B1 | * | 7/2003 | Nakamura | 360/29 |
| 6,781,776 B2 | * | 8/2004 | Yokozawa et al. | 360/2 |
| 7,088,536 B2 | * | 8/2006 | Kondo et al. | 360/55 |
| 2003/0021053 A1 | * | 1/2003 | Sakai | 360/67 |

FOREIGN PATENT DOCUMENTS

JP    62-234205    10/1987

* cited by examiner

*Primary Examiner*—Hoa T Nguyen
*Assistant Examiner*—Dismery E Mercedes
(74) *Attorney, Agent, or Firm*—Reed Smith LLP

(57) ABSTRACT

A magnetic data read circuit includes a differentiation circuit and an integration circuit which are individually connected to a magnetic head, and a means of read judgment for pass/fail judgment on reading operation of magnetic data detected at the magnetic head. The read judgment means has first and second storage sections in which data relating to an output signal of the differentiation circuit and the integration circuit, respectively, are stored. The read judgment section obtains data from at least one of the first storage section and the second storage section and makes a pass/fail judgment on reading operation of the magnetic data. Such a magnetic data read circuit improves accuracy of reading magnetic data stored in a magnetic recording medium from a single transfer of the magnetic recording medium data.

10 Claims, 14 Drawing Sheets

Fig. 14
(Prior Art)
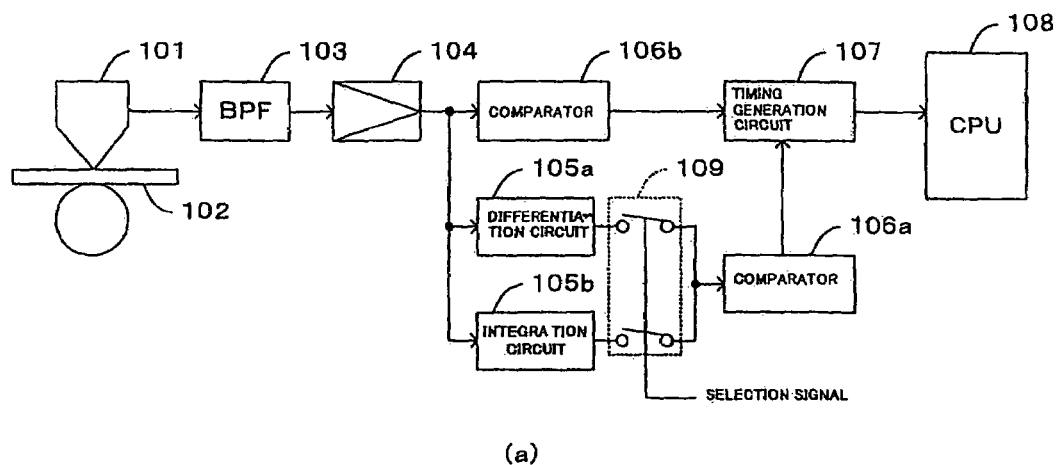
(a)
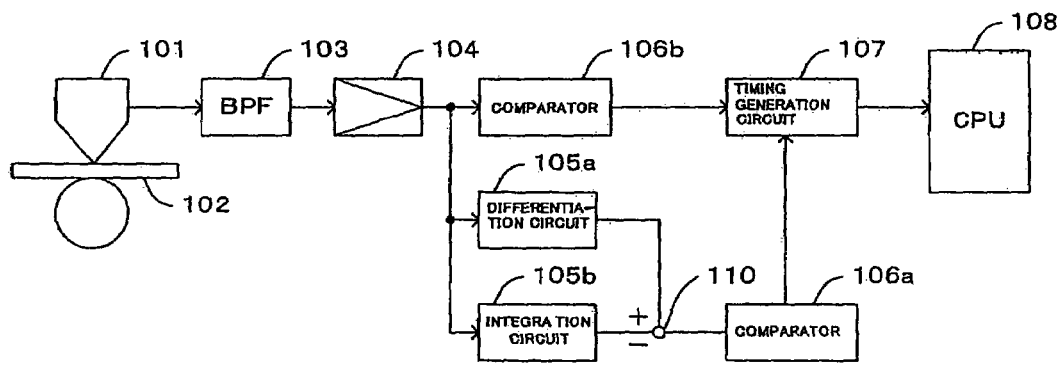
(b)

MAGNETIC DATA READ CIRCUIT AND CARD PROCESSING UNIT

FIELD OF THE INVENTION

The present invention relates to a magnetic data read circuit and a card processing unit that read out magnetic data saved in a magnetic recording medium by using a magnetic head; and in particular, the invention relates to such a magnetic data read circuit and a card processing unit that aim to improve reading accuracy.

BACKGROUND OF THE INVENTION

In general, what is known as a magnetic recording method to be used for a magnetic record regeneration system such as a magnetic card reader and so on is an FM modulation method, in which binary magnetic data is recorded into a magnetic recording medium by applying combination of two kinds of frequencies, namely F and 2F. When reading out the magnetic data that has been recorded by the FM modulation method, a magnetic head is slid relatively against a magnetic stripe on the magnetic recording medium to regenerate the magnetic data as an analog regeneration signal, with which the binary data becomes demodulated.

Regarding the demodulation process, concrete explanation is given by using FIG. 11 and FIG. 12. FIG. 11 is a block diagram to show an electrical structure of a circuit that puts the demodulation process into practice by the FM modulation method. Meanwhile, FIG. 12 includes drawings of signal waveforms, each of which relates to its corresponding position in the circuit shown by FIG. 11. That is to say; the signal waveforms of (b) to (g) in FIG. 12 show those at the positions of (b) to (g) in FIG. 11. Incidentally, the signal waveform of FIG. 12(a) is a signal waveform of a record signal saved in a magnetic stripe of a magnetic card 102.

In FIG. 11 and FIG. 12; a magnetic head detection signal (Refer to FIG. 12(b)) obtained by sliding a magnetic head 101 relatively against the magnetic stripe on the magnetic card 102 is processed at first so as to remove high-frequency noise by using a band pass type filter, i.e., BPF (Band Pass Filter) 103 (Refer to FIG. 12(c)), and subsequently the signal being as BPF output is input into an amplifier 104. Then, the BPF output amplified by the amplifier 104 is input into a peak detection circuit 105. After peak detection is carried out there (Refer to FIG. 12(d)), zero cross point detection of the peak detection signal is carried out in a comparator 106a (Refer to FIG. 12(e)). On the other hand, the BPF output amplified by the amplifier 104 is also input into a comparator 106b in order to carry out zero cross point detection of the BPF output through comparison with a zero level (Refer to FIG. 12(f)). Finally, a timing generation circuit 107 outputs a signal that has a signal level of the output signal of the comparator 106b at each changeover timing from/to Hi-level and to/from Lo-level of the output signal of the comparator 106a (Refer to FIG. 12(g)). Thus, the signal waveform of FIG. 12(a) is obtained to complete the demodulation process.

In this sample case, a differentiation circuit is used as the peak detection circuit 105 in FIG. 11 and FIG. 12 (Refer to FIG. 12(d)). However, operation only with the peak detection circuit 105 as a differentiation circuit does not work out adequately sometimes. For example, if a passing speed of the magnetic card 102 in relation to the magnetic head 101 suddenly becomes slow, change in an analog regeneration signal by magnetic reversal becomes so small that the peak detection signal shown by FIG. 12(d) results in a signal with small peak values as the solid line shows in FIG. 13(d). Consequently, in the output signal of the comparator 106a there are generated a couple of so-called saddles SD1 and SD2 (Refer to FIG. 13(e)), and an irregular signal shown by FIG. 13(g) is input into a CPU 107 to cause a read error.

To avoid such a bad influence by the saddles SD1 and SD2, sometimes an integration circuit is used instead of the differentiation circuit as the peak detection circuit 105. In that case, an output signal of the integration circuit results in a signal waveform as the dotted line shows in FIG. 13(e). Then, zero cross point detection is carried out through comparison with a zero level by the comparator 106a, in the same manner as an operation using a differentiation circuit; and eventually it becomes possible to avoid the bad influence by the saddles SD1 and SD2 shown in FIG. 13(e). However, when such an integration circuit is used, it may become difficult to detect a peak in a signal with a long time-interval and a low-frequency noise may come up due to noise accumulation. As a result, there exists a chance of a read error because of another reason that is different from the problem of the saddles SD1 and SD2 described above.

Thus, taking into account that it is difficult to maintain a sufficient reading accuracy in a magnetic data read circuit in which only one of the differentiation circuit and integration circuit is built in; a magnetic data read circuit, where both of the differentiation circuit and integration circuit are built in, is being developed. For example, in the magnetic data read circuit that FIG. 14(a) shows, there is placed an analog switch 109 (a relay, etc.) for selecting one of a differentiation circuit 105a and an integration circuit 105b in the circuit so that a changeover is made between the differentiation circuit 105a and the integration circuit 105b by sending a selection signal, as required, to the analog switch in order to enable reading the magnetic data with optimum circuit condition. Furthermore, if a read error comes up while peak detection is carried out by the differentiation circuit 105a (or the integration circuit 105b), it is possible to try reading the magnetic data again while changing to the integration circuit 105b (or the differentiation circuit 105a, respectively) by sending the selection signal described above.

Furthermore, there is developed another magnetic data read circuit, in which no changeover between the differentiation circuit and the integration circuit is made but output signals from both the circuits are synthesized for improvement of reading accuracy (For example, refer to FIG. 14(b) and Japanese Unexamined Patent Publication (Kokai) No. 62-234205, incorporated herein by reference). In a magnetic data read circuit shown by FIG. 14(b), there is placed a subtraction circuit 110, by which the output signal of the integration circuit is subtracted from the output signal of the differentiation circuit. As a result, it becomes possible to prevent any of so-called saddles from coming up in an output signal of the comparator 106a (Refer to FIG. 13(e)), and eventually to avoid any read error.

Incidentally, other demodulation methods in addition to the method shown by FIG. 14(b) in which both the output signals of the differentiation circuit 105a and the integration circuit 105b are used; include, for example, a method where the output signal of the integration circuit 105b is used as a gate signal to the differentiation circuit 105a (Namely; an AND operation between the output signal of the differentiation circuit 105a and the output signal of the integration circuit 105b is considered), and another method using a circuit where the output signal of the differentiation circuit 105a and the output signal of the integration circuit 105b are compared and integrated (For example, the output signal of the integration circuit and an F2F signal are synthesized by a circuit of a diode and so on, and then the newly synthesized signal is used as a gate signal to a circuit where the output signal of the differentiation circuit becomes the data).

However, in the circuit described above where demodulation is carried out by a changeover between the differentiation circuit and the integration circuit as required; if once a read error occurs, it becomes necessary to change from the circuit being selected at the time to the other circuit between the differentiation circuit and the integration circuit, and then read again the magnetic data. Therefore, it is required to transfer the magnetic card again, and namely it is difficult to read the magnetic data with high accuracy through "One-and-only" transfer of the magnetic card.

Furthermore, also in the circuit where demodulation is carried out by using both the output signals of the differentiation circuit and the integration circuit; if once a read error occurs, it is necessary to read the magnetic data again through the same circuits. Therefore, it is required to transfer the magnetic card again, and as described above, namely it is difficult to read the magnetic data with high accuracy through "One-and-only" transfer of the magnetic card. In particular, when reading the magnetic data is carried out again under the same circuit condition, there is a strong possibility of another read error because of no hardware-wise change in reading conditions.

SUMMARY OF THE INVENTION

The present invention has been developed in view of the problem described above, and the objective of the present invention is to provide a magnetic data read circuit and a card processing unit with which it becomes possible to improve accuracy of reading magnetic data saved in a magnetic recording medium through one-and-only transfer of the magnetic recording medium.

To solve the problem identified above, a magnetic data read circuit is provided with: a differentiation circuit and an integration circuit which are individually connected to a magnetic head; and a means of read judgment for pass/fail judgment on reading operation of magnetic data detected at the magnetic head; wherein the means of read judgment has; a first storage section in which data relating to an output signal of the differentiation circuit is stored; a second storage section in which data relating to an output signal of the integration circuit is stored; and a read judgment section which obtains data from at least one of the first storage section and the second storage section and makes a pass/fail judgment on reading operation of the magnetic data.

According to the present invention, in the magnetic data read circuit that includes the differentiation circuit, the integration circuit, and the means of read judgment for pass/fail judgment on reading operation of the magnetic data; the means of read judgment has the first storage section in which data relating to an output signal of the differentiation circuit is stored, the second storage section in which data relating to an output signal of the differentiation circuit is stored, and the read judgment section which obtains data from at least one of the first storage section and the second storage section and makes a pass/fail judgment on reading operation of the magnetic data. Therefore, it is possible to improve accuracy of reading the magnetic data (to decrease a possibility of having a read error) saved in a magnetic recording medium through one transfer operation of the magnetic recording medium.

That is to say; through one transfer operation of the magnetic recording medium, the data relating to the output signal of the differentiation circuit and the other data relating to the output signal of the integration circuit are each stored in the first storage section and the second storage section, respectively. Therefore, the read judgment section is able to access the first storage section to obtain the data relating to the output signal of the differentiation circuit and try to read the magnetic data, as well as to access the second storage section to obtain the data relating to the output signal of the integration circuit and try to read the magnetic data. Eventually, for example, even if a read error occurs in one of the two operations described above, it is still possible to change software-wise to the other operation so as to try again reading the magnetic data. Therefore, it is possible to decrease a possibility of having a read error through one transfer operation of the magnetic recording medium so that consequently accuracy of reading the magnetic data can be improved.

In particular; in the magnetic data read circuit shown by FIG. 14(a), the signal to be input into a CPU 108 is only either of the data relating to the output of the differentiation circuit 105a and the data relating to the output of the integration circuit 105b. Furthermore; in the magnetic data read circuit shown by FIG. 14(b), the signal to be input into the CPU 108 is a signal made up by synthesizing the output of the differentiation circuit 105a and the output of the integration circuit 105b. However, the present invention is different from these conventional arts described above; and then both the data relating to the output of the differentiation circuit 105a and the data relating to the output of the integration circuit 105b are individually input into the CPU 108. Therefore, for example, even if a read error occurs in one of the two operations described above, it is still possible to change software-wise to the other operation so as to try again reading the magnetic data.

Furthermore, in the magnetic data read circuit shown by FIG. 14(b); when reading the magnetic data is attempted again, eventually the reading operation is carried out again under the same circuit condition without any hardware-wise change. However, according to the present invention; the reading operation can be carried out again by making use of hardware-wise different signals (under hardware-wise different conditions); namely the data relating to the output signal of the differentiation circuit and the data relating to the output signal of the integration circuit. Therefore, it is possible to decrease a possibility of having a read error so that consequently accuracy of reading the magnetic data can be improved.

Hereby in the present invention, although the differentiation circuit and the integration circuit are described "to be connected" to the magnetic head, it does not exclude a case where any other elements, circuits, and so on exist between the magnetic head and the differentiation circuit and integration circuit. In other words, between the magnetic head and the differentiation circuit and integration circuit, any electrical constituent such as an amplifier, a band pass filter, and so on can be placed. Needless to describe, it is also possible to understand that such an amplifier, a band pass filter, and so on are components built in the differentiation circuit and integration circuit.

Furthermore, "the first storage section" and "the second storage section" placed in the means of read judgment can individually be structured by each independent hardware component, and can also be materialized by hardware structure in which the two storage sections share an area inside a single memory chip. For example, for the purpose it is possible to build two RAMs in the CPU, meanwhile it is also possible to build a single RAM in the CPU and use one specific part of the RAM as the first storage section and the other specific part as the second storage section.

Moreover, "the data relating to the output signal of the differentiation circuit" to be stored in the first storage section can be any of the following: namely, e.g., time data relating to the output signal of the differentiation circuit, peak-to-peak interval data of the output signal, data of time-intervals between zero cross points, and others, so long as the data relate to the output signal of the differentiation circuit. Furthermore, the same understanding can also be applied to "the data relating to the output signal of the integration circuit" to be stored in the second storage section.

According to one aspect of the present invention, time intervals between points where the output signal of the differential circuit has a certain specified level are stored in the first storage section; and time intervals between points where the output signal of the integration circuit has a certain specified level are stored in the second storage section.

According to the present invention, the first storage section described above stores the time intervals between points where the output signal of the differential circuit has a certain specified level (for example, a zero level) and the second storage section described above stores the time intervals between points where the output signal of the integration circuit has a certain specified level (for example, a zero level). Therefore, for example, if a reading error occurs during reading operation of the magnetic data by using the time intervals between the points where the output signal of the differential circuit has the certain specified level, the read judgment section described above can try reading operation again through changing to reading the magnetic data by using the time intervals between the points where the output signal of the integration circuit has the certain specified level. Therefore, it is possible to decrease a possibility of having a read error through one transfer operation of the magnetic recording medium and eventually to improve accuracy of reading the magnetic data.

When reading operation of the magnetic data is implemented by using "the time intervals" between the points where the output signal of the differential circuit and integration circuit has the certain specified level, it is also possible to carry out error detection by using a longitudinal redundancy check character (LRC character).

According to another aspect of the present invention, the magnetic data read circuit further includes: a slice circuit which is connected to the magnetic head and validates the points where the output signal of at least one of the differential circuit and the integration circuit has the certain specified level.

According to the present invention, the magnetic data read circuit described above is equipped with the slice circuit which is connected to the magnetic head and validates the points where the output signal of at least one of the differential circuit and the integration circuit has the certain specified level (for example, zero cross points). Therefore, it is possible to provide the magnetic data read circuit that is resistant to noise.

Hereby, the slice circuit "which validates the points where the output signal has the certain specified level" is for example a circuit that can generate a gate signal, which turns on only while an absolute value of the signal detected by the magnetic head is higher than the specified level. The output signal of the differentiation circuit and the integration circuit may sometimes have the specified level (for example, intersecting the zero level) at unexpected timing because of noise. However, if the gate signal described above is used, it becomes possible to ignore any point where the signal has the specified level (for example, intersecting the zero level) at unexpected timing, and therefore bad influence due to such noise can be reduced.

According to another aspect of the present invention, a card processing unit is equipped with the present magnetic data read circuit described above.

According to the present invention, the card processing unit is equipped with the magnetic data read circuit described above, therefore it is possible to decrease a possibility of having a read error through one transfer operation of the magnetic card so that consequently accuracy of reading the magnetic data can be improved.

By using the magnetic data read circuit and the card processing unit relating to the present invention; for example, even if a read error occurs in one reading operation, it is still possible to change software-wise to the other reading operation so as to try again reading the magnetic data. Therefore, it is possible to decrease a possibility of having a read error through one transfer operation of the magnetic recording medium so that consequently accuracy of reading the magnetic data can be improved.

BRIEF DESCRIPTION OF THE DRAWINGS

FIG. 14 shows block diagrams of electrical construction of magnetic data read circuits, in each of which both a differentiation circuit and an integration circuit are built in.

DETAILED DESCRIPTION OF THE INVENTION

Figure 1:
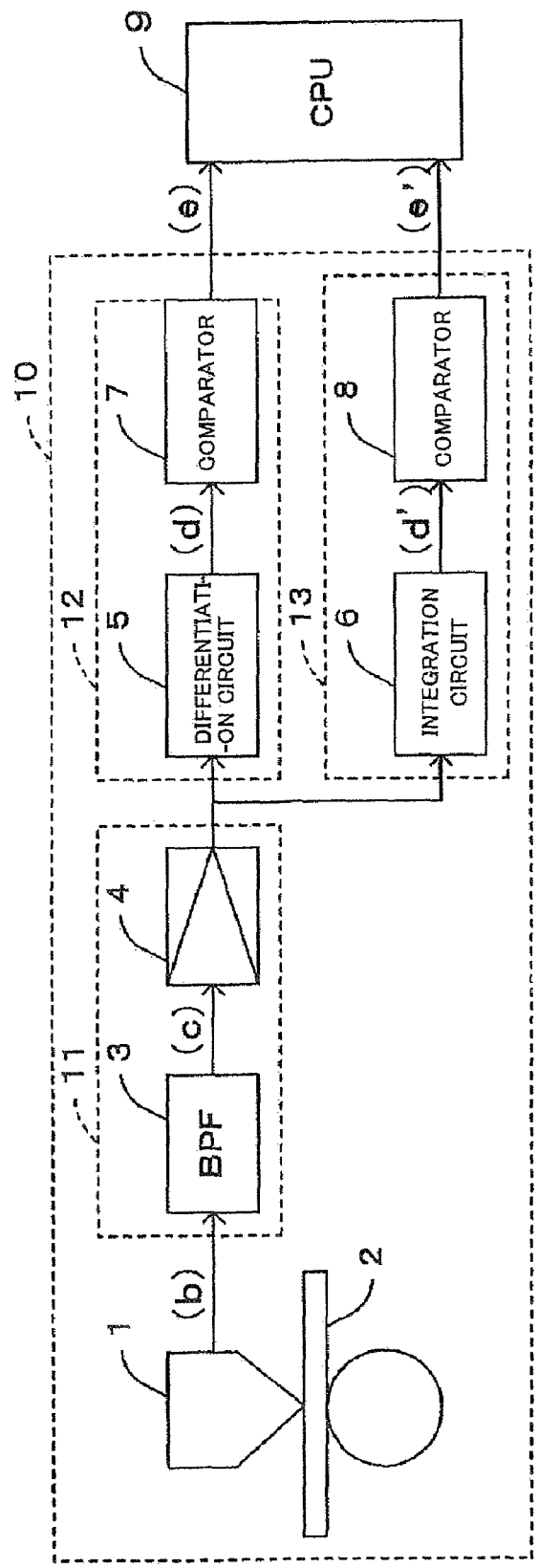
FIG. 1 is a block diagram showing electrical construction of a magnetic data read circuit relating to an embodiment of the present invention.

A preferred embodiment of the present invention is described below with reference to the accompanying drawings and the following reference numerals:

1. Magnetic head
2. Magnetic card
3. BPF
4. Amplifier
5. Differentiation circuit
6. Integration circuit
7 & 8. Comparators
9. CPU FIG. 1 is a block diagram showing electrical construction of a magnetic data read circuit relating to an embodiment of the present invention. Incidentally, although it is assumed in this embodiment that the magnetic data read circuit is installed in a card processing unit, the present invention is not restricted to application to a type of unit of this embodiment and can be installed in any kind of unit so long as the unit is what requires a function of reading magnetic data.

In FIG. 1, the magnetic data read circuit relating to this embodiment includes; a magnetic head 1, a BPF (Band Pass Filter) 3, an amplifier 4, a differentiation circuit 5, a integration circuit 6, a couple of comparators 7 and 8, a pass/fail judgment circuit such as a CPU 9. Furthermore, under the magnetic head 1, there is indicated a magnetic card 2 that is a reading object of magnetic data.

While contacting and sliding on a magnetic stripe on a surface of the magnetic card 2, the magnetic head 1 records and regenerates magnetic data. More concretely to describe, the magnetic head 1 is composed of at least one couple of magnetic cores which are placed so as to face each other and sandwich a magnetic gap (gap spacer). One of the magnetic cores is wound with a regeneration coil, while the other is wound with a recording coil; and the head section is pressed against the magnetic card 2 with a certain pad pressing force and is relatively slid on the card. Through these operations, it becomes possible to read out (regenerate) magnetic data saved in the magnetic card 2 and to write (record) new magnetic data into the magnetic card 2. By the way, usually the magnetic head 2 is laid out so as to protrude its gap-forming surface into a card transfer path.

To the magnetic head 1, the differentiation circuit 5 and the integration circuit 6 are connected through the band pass type filter, i.e., BPF (Band Pass Filter) 3 and the amplifier 4. The BPF 3 is a circuit that allows only a signal having a specified range of frequency to pass through; namely for example, allows only a signal of frequency from 1000 Hz to 2000 Hz to pass through. As a result, high-frequency noise can be removed. Furthermore, the amplifier 4 is composed of an operational amplifier, a condenser, and so on; and it is a circuit to amplify amplitude of a signal.

An output of the differentiation circuit 5 is waveform-shaped by the comparator 7, and then subsequently input into the CPU 9 as a comparator output. On this occasion, the comparator output becomes a signal in which a signal level changes between a Hi-level and a Lo-level at a zero cross point in the output signal of the differentiation circuit 5. On the other hand, an output of the integration circuit 6 is waveform-shaped by the comparator 8 in the same manner as described above, and then subsequently input into the CPU 9 as another comparator output. On this occasion, the comparator output becomes a signal in which a signal level changes between a Hi-level and a Lo-level at a zero cross point in the output signal of the integration circuit 6.

Figure 2:
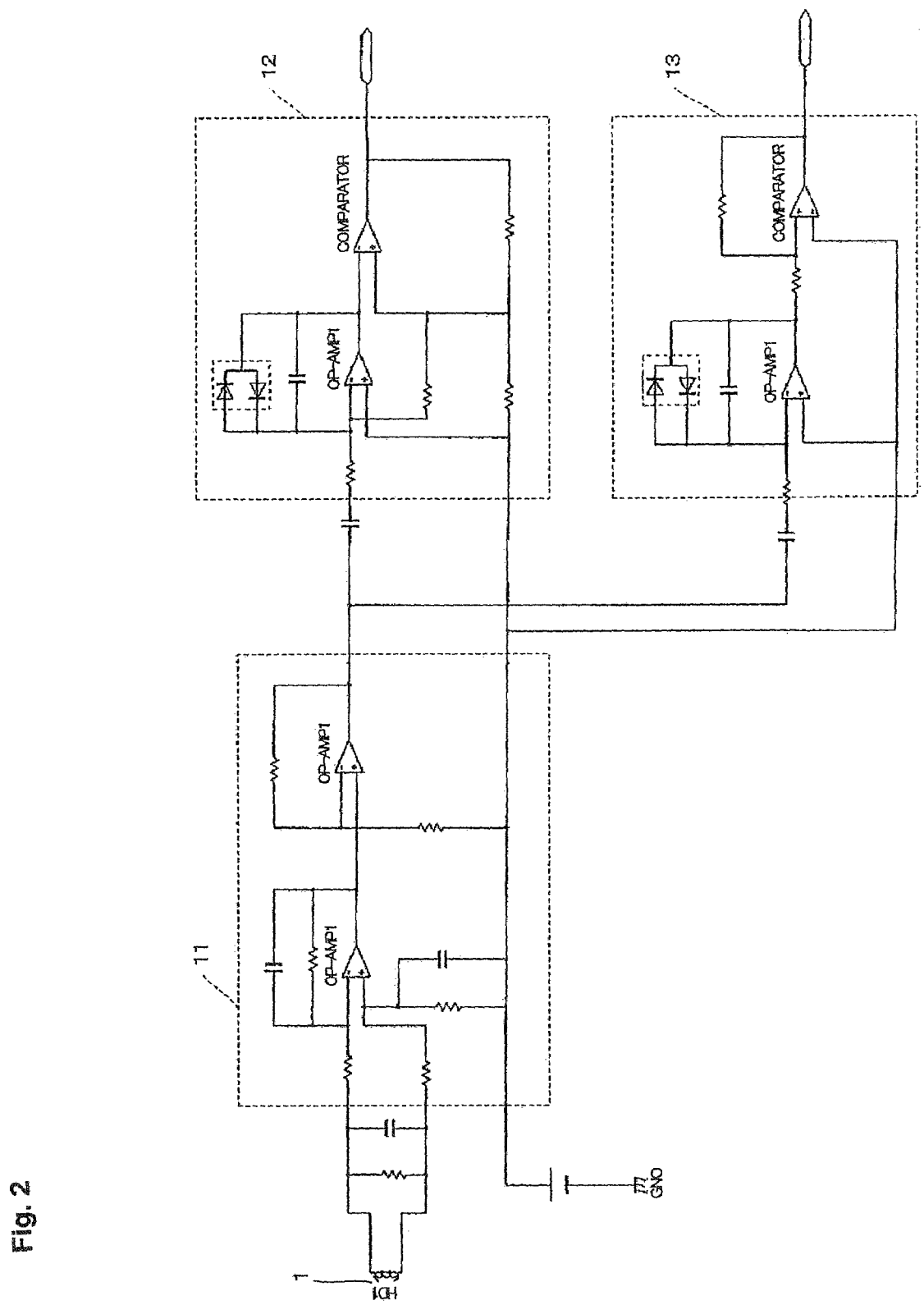
FIG. 2 is a circuit diagram showing an example of concrete electrical construction inside a dot-lined frame indicated in FIG. 1.

FIG. 2 is a circuit diagram showing an example of concrete electrical construction inside a dot-lined frame 10 indicated in FIG. 1.

In FIG. 2, the BPF 3 and the amplifier 4 (Refer to FIG. 1) are indicated in a dot-lined frame 1. Meanwhile, the differentiation circuit 5 and the comparator 7 (Refer to FIG. 1) are indicated in a dot-lined frame 12. Furthermore, the integration circuit 6 and the comparator 8 (Refer to FIG. 1) are indicated in a dot-lined frame 13. Incidentally, detailed explanation on contents inside each dot-lined frame is omitted.

In subsequent explanation using FIG. 1 again, the output of the comparator 7 and the output of the comparator 8 are input into the CPU 9. Incidentally in FIG. 1, the output of the comparator 7 and the output of the comparator 8 are each wired with an independent electrical cable (2 pieces in total), but the present invention is not restricted to this arrangement and it is also possible to carry out the input operation with a single electrical cable so long as independent relationship of each output can be maintained.

The CPU 9 presides over comprehensive electrical control, and has a function of pass/fail judgment on reading operation of magnetic data detected at the magnetic head 1. Then, an internal section of the CPU is equipped with a storage section in which the output of the comparator 7 and the output of the comparator 8 are each saved independently. More detailed explanation is given by using FIG. 3.

Figure 3:
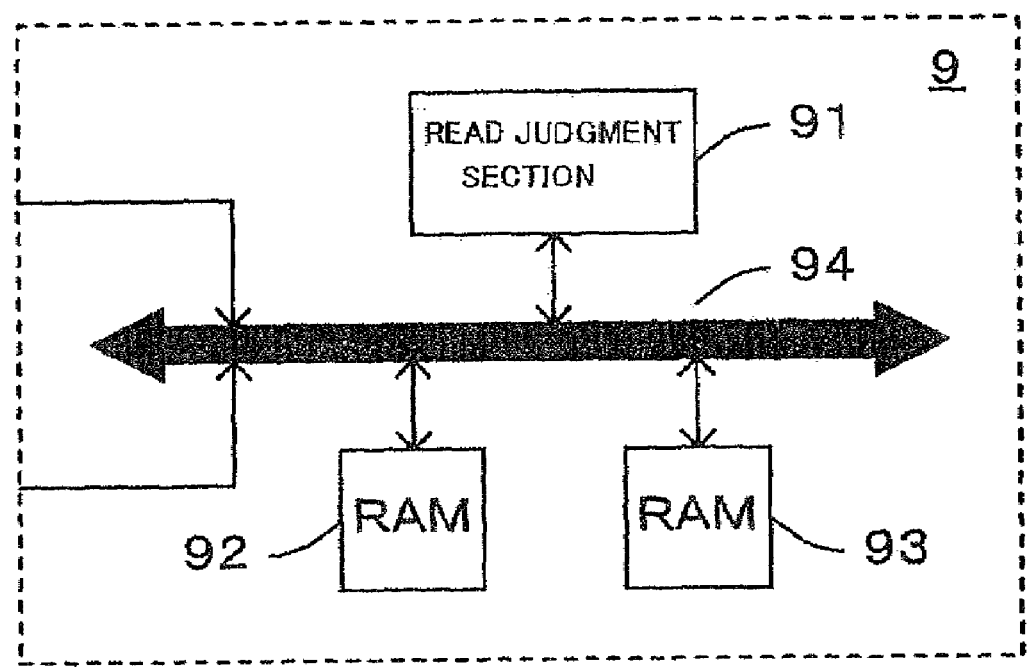
FIG. 3 is a block diagram showing internal electrical construction of the CPU indicated in FIG. 1.

FIG. 3 is a block diagram showing internal electrical construction of the CPU 9 indicated in FIG. 1.

In FIG. 3, the CPU 9 is composed of a read judgment section 91, a RAM 92, a RAM 93, and a bus 94. The RAM 92 serves to store data in relation to an output signal of the differentiation circuit 5, for example a time interval between zero cross points of the output signal of the differentiation circuit 5, and the RAM corresponds to an example of a first storage section described in the claims. Meanwhile, the RAM 93 serves to store data in relation to an output signal of the integration circuit 6, for example a time interval between zero cross points of the output signal of the integration circuit 6, and the RAM corresponds to an example of a second storage section described in the claims.

Figure 4:
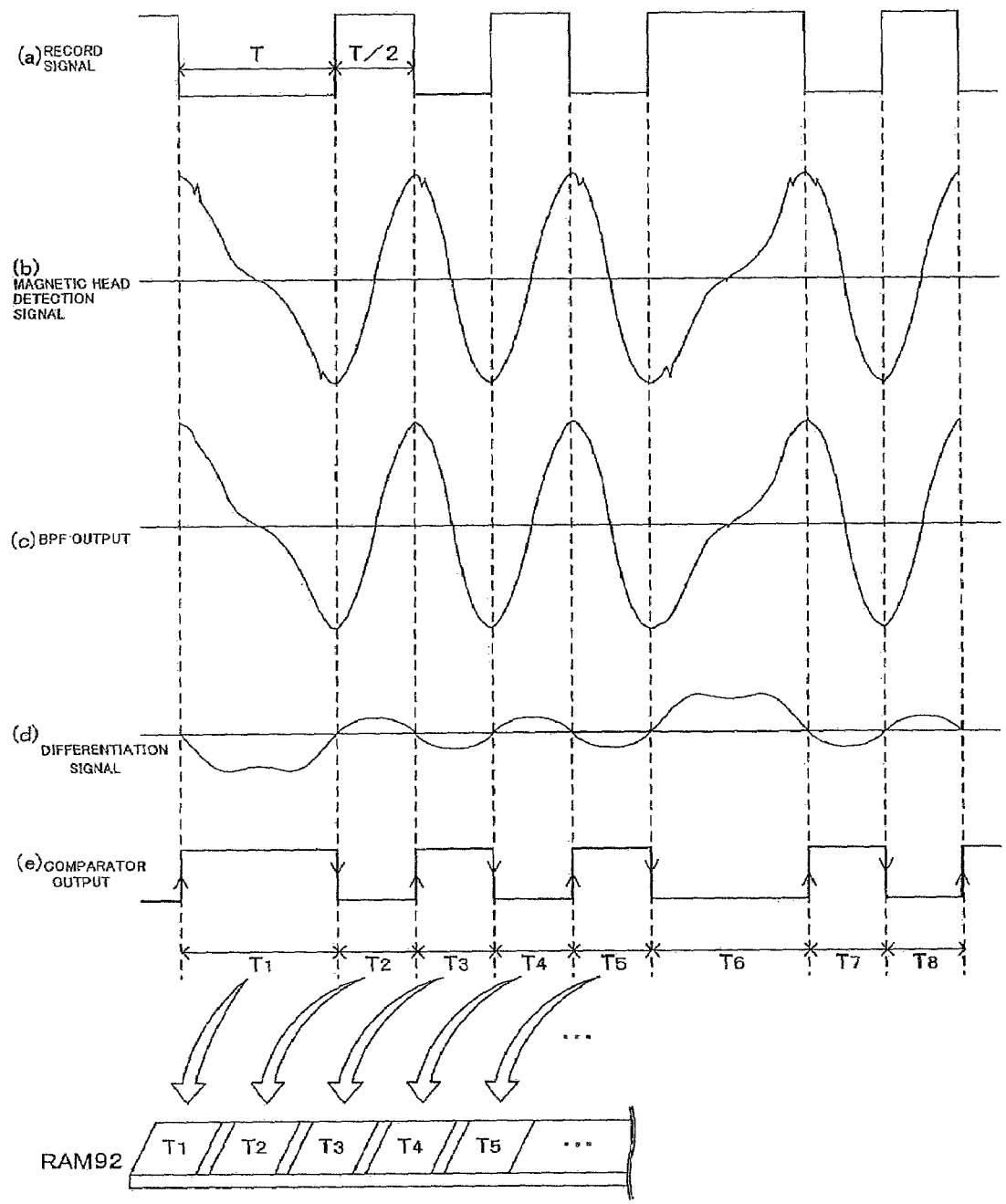
FIG. 4 shows signal waveforms of each section of the block diagram indicated in FIG. 1, as well as condition where the output of a comparator is saved in a RAM.
Figure 5:
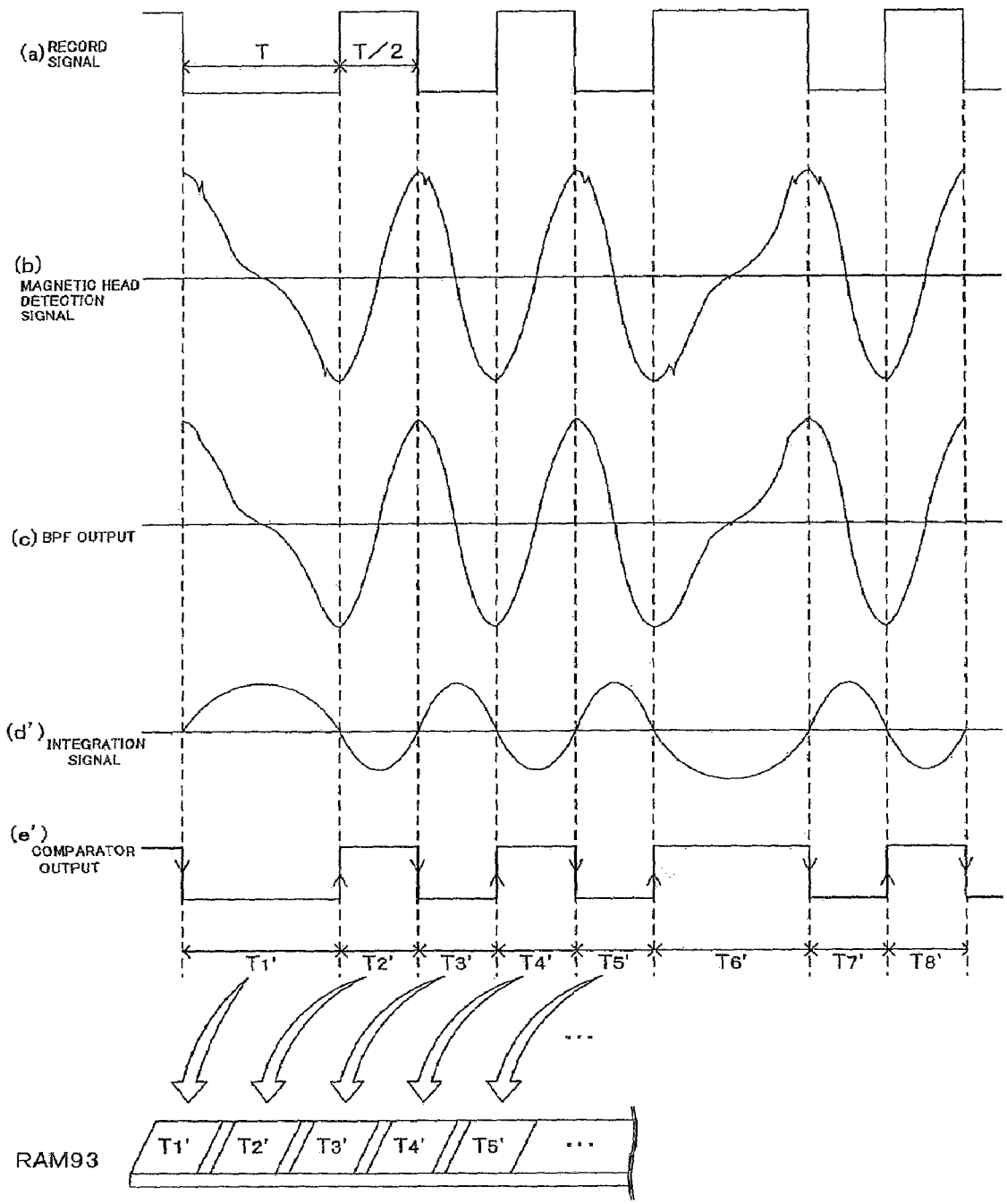
FIG. 5 shows signal waveforms of each section of the block diagram indicated in FIG. 1, as well as condition where the output of a comparator is saved in a RAM.

FIG. 4 shows signal waveforms of each section of the block diagram indicated in FIG. 1, as well as condition where the output of the comparator 7 is saved in the RAM 92. Meanwhile, FIG. 5 shows signal waveforms of each section of the block diagram indicated in FIG. 1, as well as condition where the output of the comparator 8 is saved in the RAM 93. By the way, the signal waveforms of (b), (c), (d), (e), (d'), and (e') in FIG. 4 and FIG. 5 show the signal waveforms at the positions of (b), (c), (d), (e), (d'), and (e') in FIG. 1. Furthermore, the signal waveforms of FIG. 4(a) and FIG. 5(a) are a signal waveform (as an example) of a recorded signal saved in a magnetic stripe on a surface of the magnetic card 2. The record signal is composed of a series of binary signals made by combination of two kinds of frequencies, i.e., F and 2F, with which no change in signal polarity within one-bit time interval T means "0" and a change in signal polarity within one-bit time interval T means "1". Eventually, the record signal is composed of a series of binary signals of "01101".

In FIG. 4 and FIG. 5, the magnetic head detection signal (Refer to FIG. 4(b) and FIG. 5(b)) obtained by sliding the magnetic head 1 relatively against the magnetic stripe on the surface of the magnetic card 2 is processed so as to remove high-frequency noise by using the band pass type filter, i.e., BPF (Band Pass Filter) 3 (Refer to FIG. 4(c) and FIG. 5(c)), and subsequently the signal being as BPF output is input into the amplifier 4. Then, the BPF output amplified by the amplifier 4 is input into the differentiation circuit 5 and the integration circuit 6.

In FIG. 4; the differentiation signal, for which peak detection has been carried out by the differentiation circuit 5 (Refer to FIG. 4(d)), is compared with a zero level for zero cross point detection by the comparator 7 (FIG. 4(e)). Then, in the CPU 9 into which the signal shown by FIG. 4(e) has been input; time intervals between rising timing and falling timing, T1, T2, T3, T4, T5 and so on; which are namely time intervals between points where the differentiation signal (Refer to FIG. 4(d)) intersects the zero level, T1, T2, T3, T4, T5 and so on; are stored into the RAM 92.

In FIG. 5; the integration signal, for which peak detection has been carried out by the integration circuit 6 (Refer to FIG. 5(d')), is compared with a zero level for zero cross point detection by the comparator 8 (FIG. 5(e')). Then, in the CPU 9 into which the signal shown by FIG. 5(e') has been input; time intervals between rising timing and falling timing, T1', T2', T3', T4', T5' and so on; which are namely time intervals between points where the integration signal (Refer to FIG. 5(d')) intersects the zero level, T1', T2', T3', T4', T5' and so on; are stored into the RAM 93.

Thus, in the present embodiment, data relating to the output signal of the differentiation circuit 5 and other data relating to the output signal of the integration circuit 6 are stored in each different RAM (the RAM 92 and the RAM93). By the way, instead of applying a circuit format in which independent RAMs (2 pieces) are built in the CPU 9 as described above, another circuit format in which a single RAM is built in the CPU 9 may be applied, wherein a certain part of the storage area of the single RAM is used as the first storage section while another certain part of the storage area is used as the second storage section. Furthermore, as a storage device, it is possible to use any type of storage devices such as; a DRAM, a SRAM, an MRAM, a cache memory, and so on.

The read judgment section 91 practically judges pass/fail condition on reading status of the magnetic data detected by the magnetic head 1, and the section is composed of various electrical elements, for example; a control unit, a floating-point arithmetic unit, an integer arithmetic unit, a decoder, a fetch unit and so on. It is possible for the read judgment section 91 described above to access the RAM 92 described above via the bus 94 for trying to read the magnetic data by obtaining the time intervals between points where the differentiation signal (Refer to FIG. 4(d)) intersects the zero level, T1, T2, T3, T4, T5 and so on. Meanwhile, it is also possible to access the RAM 93 described above via the bus 94 for trying to read the magnetic data by obtaining the time intervals between points where the integration signal (Refer to FIG. 5(d')) intersects the zero level, T1', T2', T3', T4', T5' and so on.

For explanation of pass/fail condition on reading status of the magnetic data, if the time intervals T1, T2, T3, T4, T5 and so on includes any time interval other than regular clock pulse intervals, i.e., T and T/2, it can be judged as a reading error. Meanwhile, if all the time intervals are regular clock pulse intervals, i.e., T and T/2, it can be judged that the reading operation has succeeded.

Moreover, it is also possible to carry out error detection by using a longitudinal redundancy check character (LRC character). More concretely to describe, the LRC character is recorded for each track. When reading is carried out in due order from a starting symbol, data, and a closing symbol, an adding position for the LRC character is just after the closing symbol. Furthermore, bit structure of the LRC character is the same as bit structure of a data character. For example, if the magnetic card 2 is a magnetic card in compliance with the ISO standards, a third track of the magnetic card is provided with a data record density of 210 BPI. When the card transfer speed is 190 mm/s, time corresponding to one bit is given as 636.6 µs. If a sampling rate of A/D conversion for an analog waveform is 10 µs, a theoretical value of the number of points included in one bit is 63.7. Then, segmentation is put into practice by making use of this theoretical value.

On this occasion, in the third track of the magnetic card 2, which is in compliance with the ISO standards; 4 data bits and 1 parity bit, i.e., 5 bits in total, are used to express one character. In other words, odd parity is applied so that Bit-0 can only be with an even number. Therefore, a peak interval value of a section making up one segment in the magnetic head detection signal is one of three values, i.e., 6, 8, and 10.

Therefore, in FIG. 4; the time intervals, T1, T2, T3, T4, T5 and so on saved in the RAM 92 are treated as a segmentation, and values of the time intervals, T1, T2, T3, T4, T5 and so on of one segmentation are calculated. Eventually, it becomes possible to determine a reading error when a calculated value is any other than the three values, i.e., 6, 8, and 10. Also in the case of FIG. 5, error detection can be done in the same manner. Incidentally, more detailed explanation on error detection is omitted.

Figure 6:
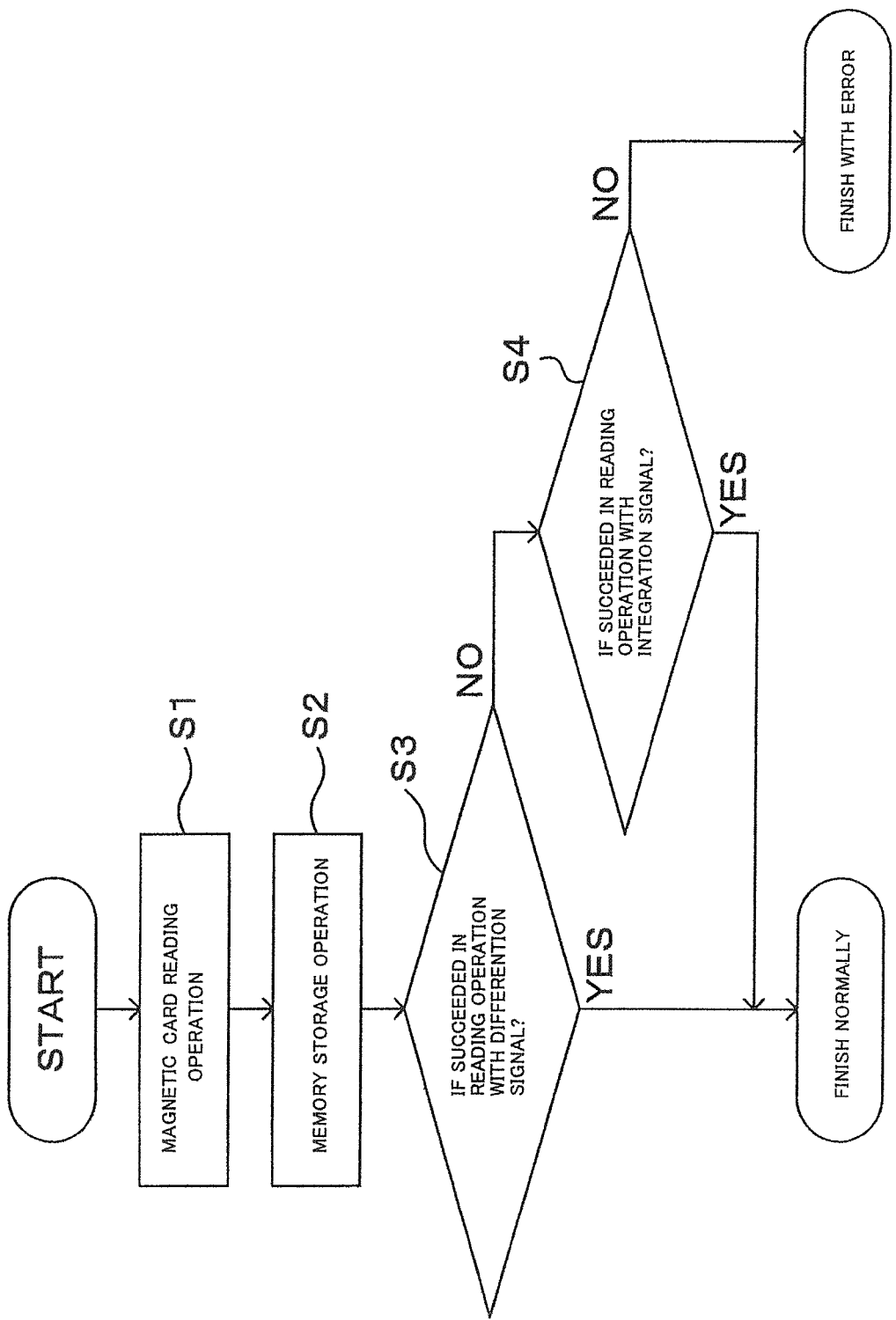
FIG. 6 is a flowchart for explaining circuit operation of the magnetic data read circuit relating to the embodiment of the present invention.

FIG. 6 is a flowchart for explaining circuit operation of the magnetic data read circuit relating to the embodiment of the present invention.

In FIG. 6, the magnetic card is read out at first (Step S1). More concretely to describe, when the magnetic card 2 is inserted into a card insertion slot, the magnetic card 2 is drawn into an internal section by a driving roller. At the time, the magnetic head 1 contacts and slides on the stripe on the surface of the magnetic card 2 to obtain the magnetic head detection signal. Subsequently, the magnetic head detection signal is processed so as to remove high-frequency noise and have the signal amplified through the BPF 3 and the amplifier 4, and then the signal is input into the differentiation circuit 5 and the integration circuit 6 individually. An output of the differentiation circuit 5 is waveform-shaped by the comparator 7, and then subsequently input into the CPU 9 as a comparator output. Meanwhile, an output of the integration circuit 6 is waveform-shaped by the comparator 8, and then subsequently input into the CPU 9 as another comparator output.

Next, memory storage operation is carried out (Step S2). More concretely to describe, in the CPU 9; time intervals between points where the output signal of the differentiation circuit 5 intersects the zero level are stored in the RAM 92. Meanwhile, time intervals between points where the output signal of the integration circuit 6 intersects the zero level are stored in the RAM 93.

Subsequently, it is judged whether reading operation by using the differentiation signal has been successful or not (Step S3). More concretely to describe, in the CPU 9; the read judgment section 91 accesses the RAM 92 via the bus 94 to obtain the time intervals between points where the output signal of the differentiation circuit 5 intersects the zero level so as to judge whether or not reading the magnetic data has been successful. When it is judged that the reading operation has been successful, the process normally finishes.

Contrarily, when it is judged that the reading operation has failed, the read judgment section 91 accesses the RAM 93 in the CPU 9 via the bus 94 to obtain the time intervals between points where the output signal of the integration circuit 6 intersects the zero level so as to judge whether or not reading the magnetic data has been successful (Step S4). When it is judged that the reading operation has been successful, the process normally finishes. On the contrary, when it is judged that the reading operation has failed, a judgment is made to determine that a read error has happened and the process finishes with the error.

Thus, by using the magnetic data read circuit relating to the present embodiment; even in a case of having a read error happened when the data relating to the output signal of the differentiation circuit 5 is used, it is still possible to change software-wise to using the data relating to the output signal of the integration circuit 6 so as to try again reading the magnetic data. As a result, it is possible to decrease a possibility of having a read error caused by each transfer operation of the magnetic recording medium so that accuracy of reading the magnetic data can be improved.

Figure 7:
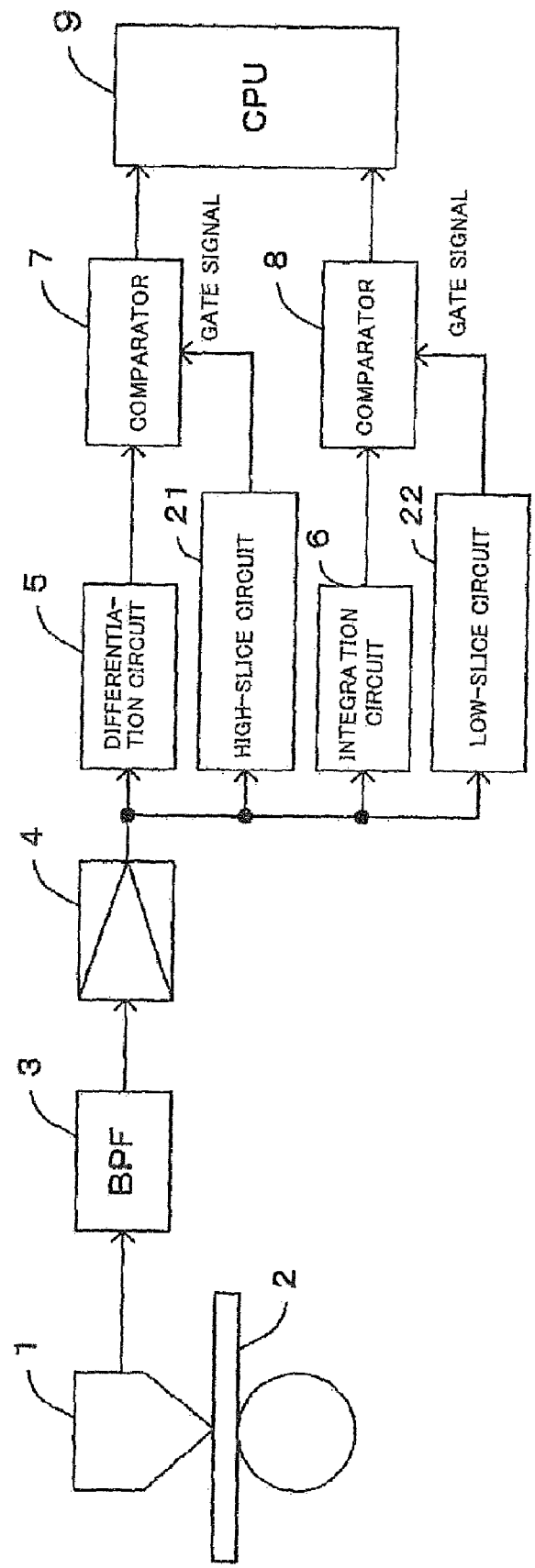
FIG. 7 is a block diagram showing electrical construction of a magnetic data read circuit relating to another embodiment of the present invention.

FIG. 7 is a block diagram showing electrical construction of a magnetic data read circuit relating to another embodiment of the present invention.

Points of the magnetic data read circuit shown by FIG. 7, which are different from those of the magnetic data read circuit shown by FIG. 1, are facts that an output of a high-slice circuit 21 is input into the comparator 7 as a gate signal and an output of a low-slice circuit 22 is input into the comparator 8 as a gate signal.

Figure 8:
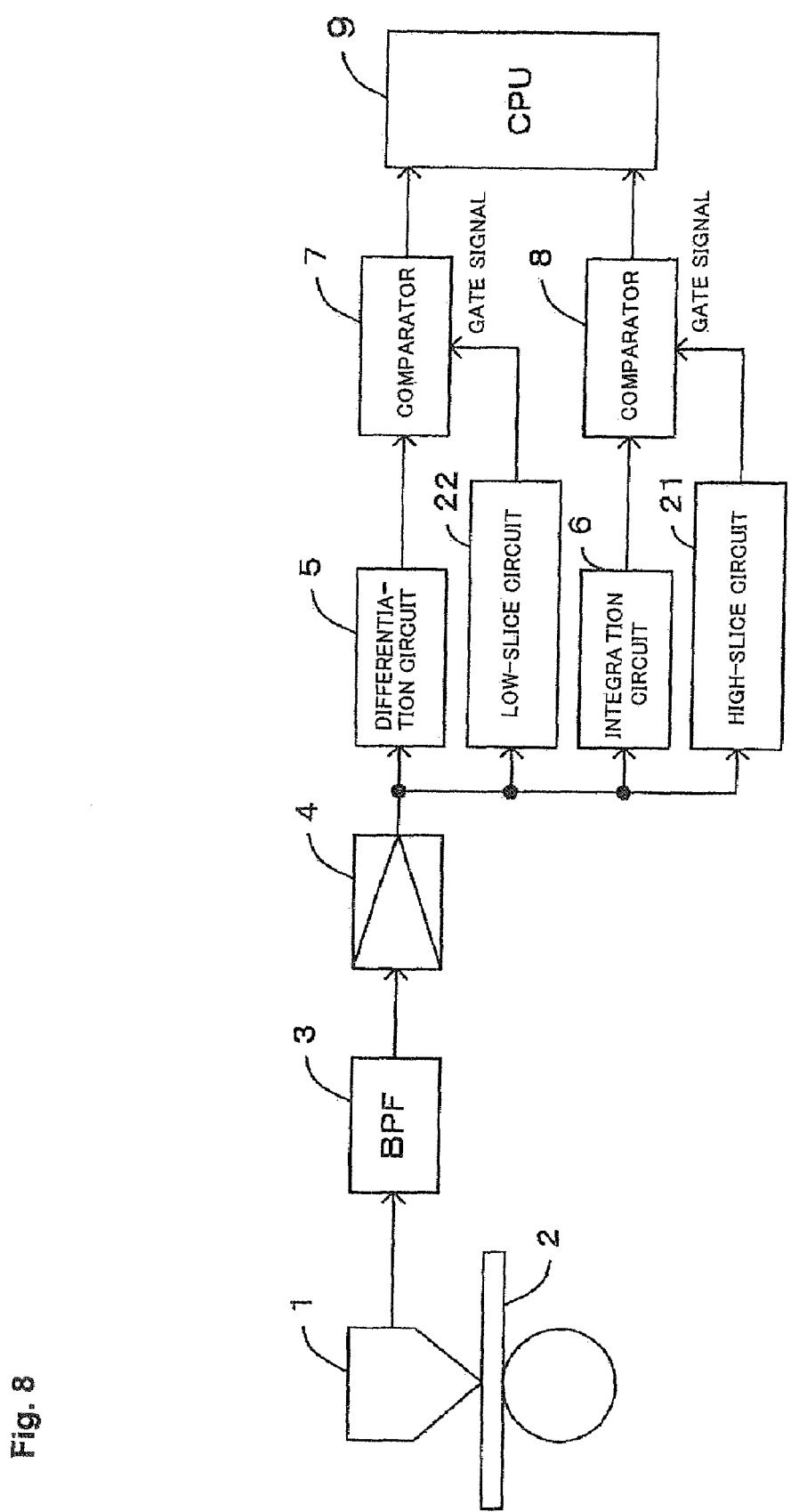
FIG. 8 is a block diagram showing electrical construction of a magnetic data read circuit relating to another embodiment of the present invention.

The high-slice circuit 21 and the low-slice circuit 22 are connected to the magnetic head 1 through the BPF 3 and the amplifier 4, and each circuit is equipped with a function to validate the points where the output signal of the differentiation circuit 5 and integration circuit 6 intersects the zero level. By the way, it is also possible to exchange positions of the high-slice circuit 21 and the low-slice circuit 22 each other, as shown in FIG. 8. In other words, the output of the low-slice circuit 22 may be input into the comparator 7 as the gate signal, while the output of the high-slice circuit 21 may be input into the comparator 8 as the gate signal. Described in the following sections in detail are operations where the output of the high-slice circuit 21 is input as the gate signal (Refer to FIG. 9), and the output of the low-slice circuit 22 is input as the gate signal (Refer to FIG. 10), both into the comparator 7.

Figure 9:
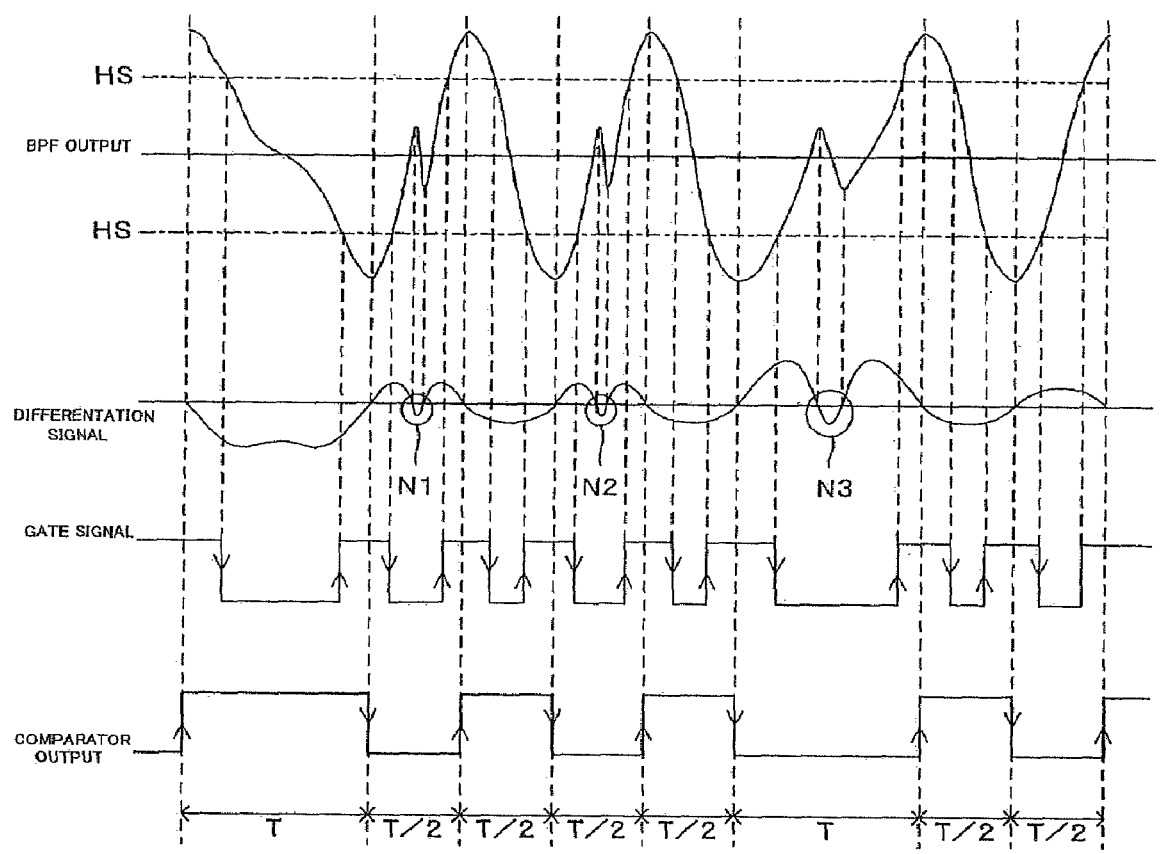
FIG. 9 shows each signal waveform in a case where an output of a high-slice circuit is input into a comparator as a gate signal.

FIG. 9 shows each signal waveform in a case where the output of the high-slice circuit 21 is input into the comparator 7 as the gate signal.

As shown in FIG. 9, in this sample case under examination, a BPF output (i.e., the output of the BPF 3 that has passed through the amplifier 4) includes noise. That is to say; in the case under examination, noise elements N1 to N3 are included in the output signal of the differentiation circuit 5 (differentiation signal). In this case, the output of the comparator 7 changes between a Hi-level and a Lo-level at a point where the differentiation signal including the noise elements N1 to N3 intersects the zero level so as to become a signal including inappropriate cycle length other than the cycle length T and T/2.

Then, by making use of the high-slice circuit 21, a gate signal that turns on only while an absolute value of the BPF output becomes greater than a specified level (HS) is generated, and then the gate signal is input into the comparator 7. In the event, in the comparator 7; a change between a Hi-level and a Lo-level is carried out only when the gate signal is turned on, among timings where the differentiation signal intersects the zero level. Consequently, it becomes possible to ignore any zero cross point caused by the noise elements N1 to N3, and therefore bad influence due to such noise can be reduced. Incidentally, as the specified level (HS), applying 120 mV for example is preferred.

Figure 10:
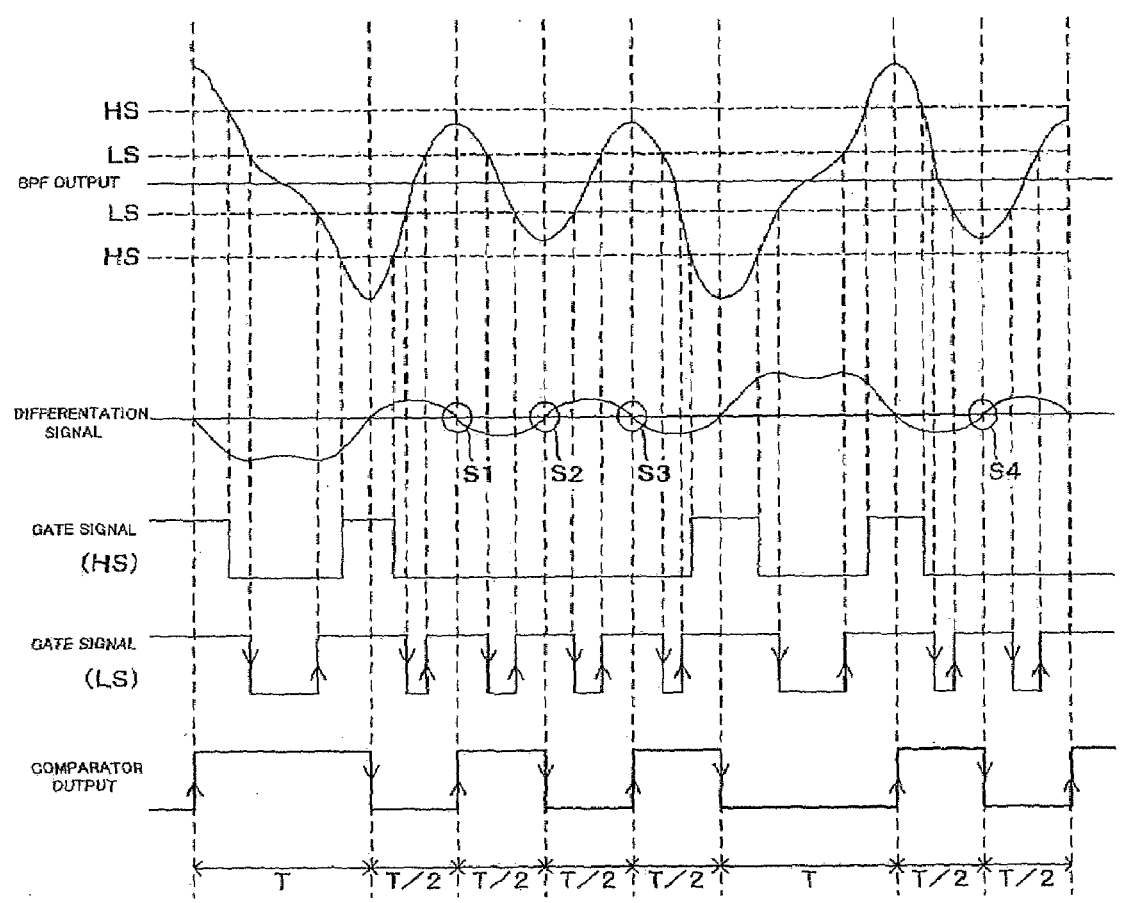
FIG. 10 shows each signal waveform in a case where an output of a low-slice circuit is input into a comparator as a gate signal.
Figure 11:
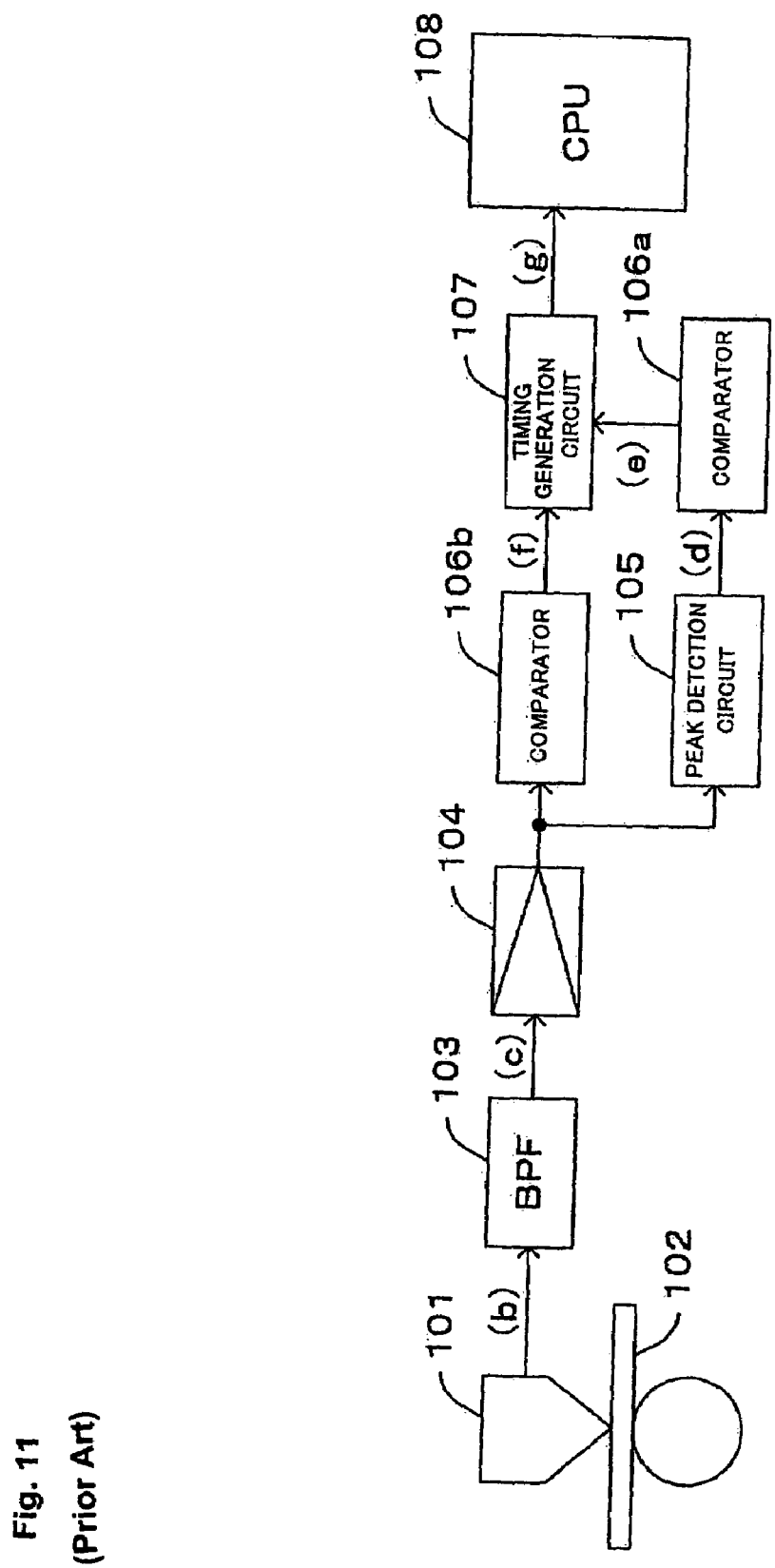
FIG. 11 is a block diagram to show electrical structure of a circuit that puts a demodulation process into practice by an FM modulation method.
Figure 12:
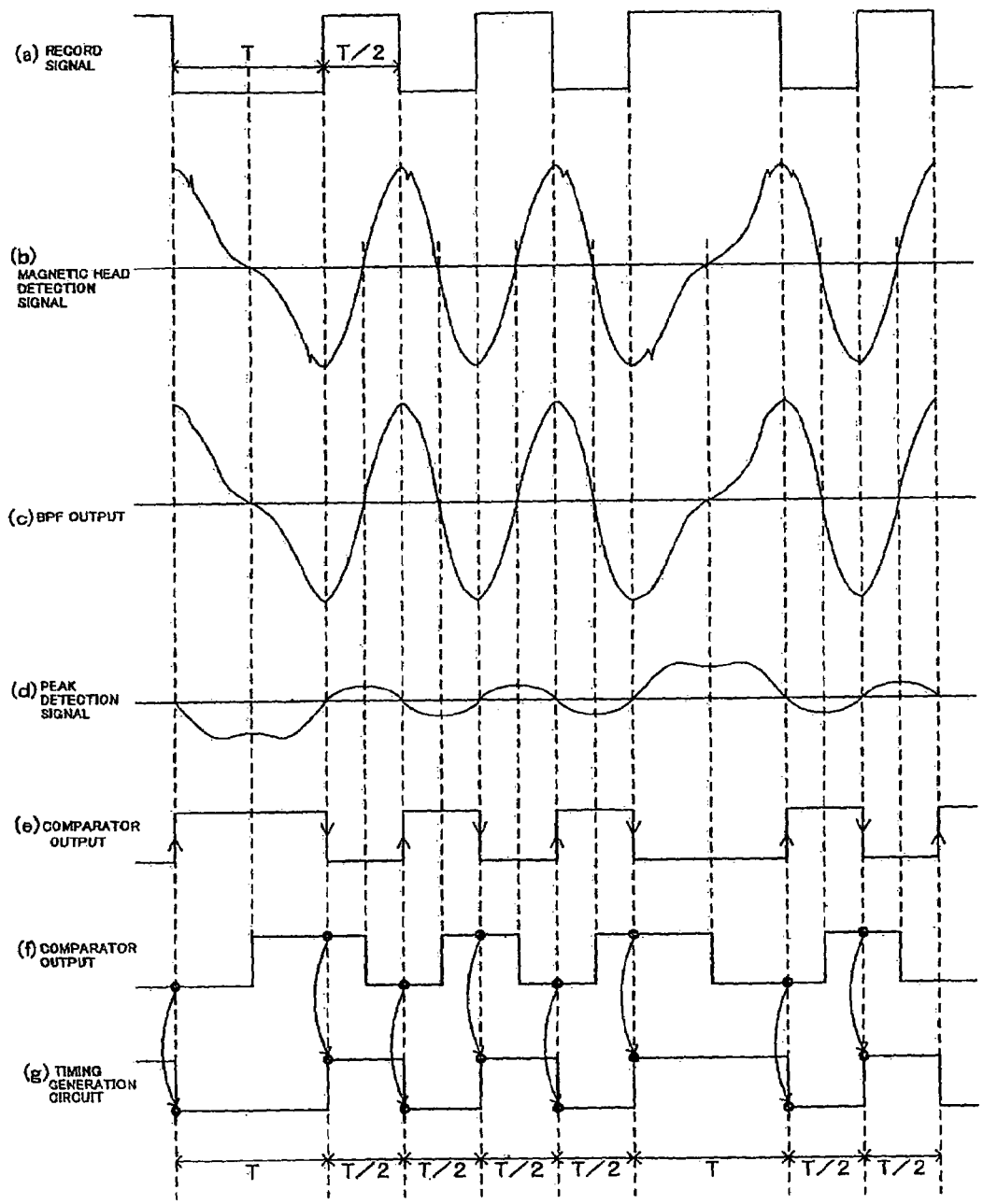
FIG. 12 shows drawings of signal waveforms, each of which relates to its corresponding position in the circuit shown by FIG. 11.
Figure 13:
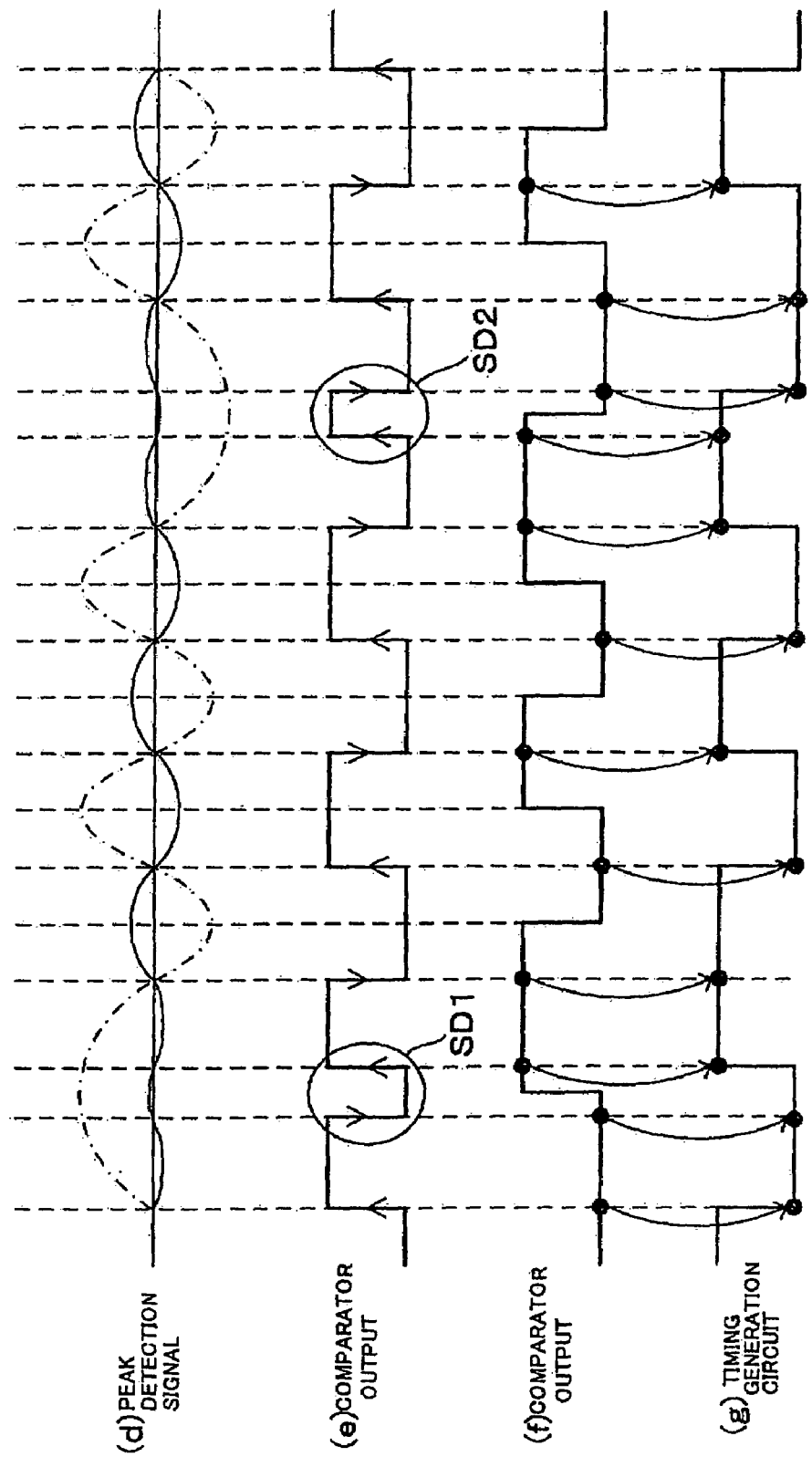
FIG. 13 shows drawings to illustrate condition where the peak values of the peak detection signal shown by FIG. 12($d$) have become less.

FIG. 10 shows each signal waveform in a case where the output of the low-slice circuit 22 is input into the comparator 7 as the gate signal.

As shown in FIG. 10, in this sample case under examination, a BPF output (i.e., the output of the BPF 3 that has passed through the amplifier 4) partially includes small amplitude. That is to say; when magnetic data of the magnetic card 2 is read out under condition where magnetism of the magnetic card is already weakened, for example, through passage of time after production of the card, the amplitude of the BPF output may be small partially. In such a case, if the output of the high-slice circuit 21 described above is made to be the gate signal (HS) to the comparator 7, signal elements from S1 to S4 in the output signal of the differentiation circuit 5 (differentiation signal) are consequently ignored so that the output signal of the comparator 7 includes inappropriate cycle length other than the cycle length T and T/2.

Then, by making use of the low-slice circuit 22; a gate signal that turns on only while an absolute value of the BPF output becomes greater than a specified level (LS), which is lower than the level HS, is generated, and then the gate signal (LS) is input into the comparator 7. In the event, in the comparator 7; it is possible to detect the points where the differentiation signal intersects the zero level, with neither any omission nor ignoring the signal elements from S1 to S4 in the differentiation signal so as to improve reading accuracy. Incidentally, as the specified level (LS), applying 30 mV for example is preferred.

Thus, by using the high-slice circuit 21 and the low-slice circuit 22 as a circuit to validate the points where the output signal of the differentiation circuit 5 intersects the zero level, eventually it becomes possible to reduce bad influence due to noise and to improve reading accuracy.

By the way, only the differentiation circuit 5 is focused in FIG. 9 and FIG. 10, but the same can be applied for the integration circuit 6. Namely, the same can be said for operations where the output of the high-slice circuit 21 is input as the gate signal, and the output of the low-slice circuit 22 is input as the gate signal, both into the comparator 8.

A magnetic data read circuit and a card processing unit relating to the present invention are valuable since they are able to reduce a chance of a reading error that may happen through a single transfer operation of a magnetic recording medium, and to improve accuracy of reading magnetic data.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A magnetic data read circuit for reading magnetic data in a magnetic recording medium comprising:

a differentiation circuit and an integration circuit which are individually connected to a magnetic head; and a means of read judgment for pass/fail judgment on reading operation of magnetic data detected at the magnetic head;

wherein the means of read judgment includes:

a first storage section in which time interval data relating to an output signal of the differentiation circuit is stored through one transfer operation of the magnetic recording medium;

a second storage section in which time interval data relating to an output signal of the integration circuit is stored through the one transfer operation of the magnetic recording medium;

a read judgment section which obtains time interval data from at least one of the first storage section and the second storage section and makes a first pass/fail judgment on reading operation of the magnetic data; and wherein when the read judgment section has made a fail judgment as the first pass/fail judgment on the time interval data from the one of the first storage section and the second storage section, the read judgment section obtains time interval data from the other of the first storage section and the second storage section to make a second pass/fail judgment without performing another transfer operation of the magnetic recording medium.

2. The magnetic data read circuit according to claim 1, wherein:

time intervals between points where the output signal of the differential circuit has a certain specified level are stored in the first storage section; and time intervals between points where the output signal of the integration circuit has a certain specified level are stored in the second storage section.

3. The magnetic data read circuit according to claim 2, further comprising:

a slice circuit which is connected to the magnetic head and validates the points where the output signal of at least one of the differential circuit and the integration circuit has the certain specified level.

4. A card processing unit equipped with the magnetic data read circuit according to claim 3.

5. The magnetic data read circuit according to claim 2, further comprising:

a slice circuit which is connected to the magnetic head and validates the points where the output signal of at least one of the differential circuit and the integration circuit has the certain specified level.

6. A card processing unit equipped with the magnetic data read circuit according to claim 2.

7. A card processing unit equipped with the magnetic data read circuit according to claim 1.

8. A magnetic data read circuit for reading magnetic data in a magnetic recording medium comprising:

a differentiation circuit and an integration circuit which are connected to a magnetic head; and a pass/fail judgment circuit connected to the differentiation circuit and the integration circuit, and including:

a first memory that stores, through one transfer operation of the magnetic recording medium, time interval data relating to an output signal of the differentiation circuit;

a second memory that stores, through one transfer operation of the magnetic recording medium, time interval data relating to an output signal of the integration circuit, the first and second memories storing data resulting from a single read process by the magnetic head;

a read judgment circuit operable to make a pass/fail judgment from the time interval data stored in the first memory and to make a pass/fail judgment from the time interval data stored in the second; and wherein when the read judgment circuit determines that the reading operation from the data stored in one of the first and second memories is a failure, then the read judgment circuit makes a pass/fail judgment on reading operation from the data stored in the other of the first and second memories without performing another transfer operation of the magnetic recording medium.

9. The magnetic data read circuit according to claim 8, wherein:

the first memory stores time intervals between points where the output signal of the differential circuit is at a first predetermined level; and the second memory stores time intervals between points where the output signal of the integration circuit is at a second predetermined level.

10. The magnetic data read circuit according to claim 9, further comprising a slice circuit connected to the magnetic head and operable to validate the points where the output signal of at least one of the differential circuit and the integration circuit is at the predetermined level.

* * * * *